US012152372B2

(12) United States Patent
Schau et al.

(10) Patent No.: US 12,152,372 B2
(45) Date of Patent: Nov. 26, 2024

(54) MOTOR GRADER REAR OBJECT DETECTION PATH OF TRAVEL WIDTH

(71) Applicant: DEERE & COMPANY, Moline, IL (US)

(72) Inventors: Joshua M. Schau, Asbury, IA (US); David A. Veasy, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 505 days.

(21) Appl. No.: 17/022,308

(22) Filed: Sep. 16, 2020

(65) Prior Publication Data

US 2022/0081877 A1 Mar. 17, 2022

(51) Int. Cl.

*E02F 9/26* (2006.01)
*E02F 3/76* (2006.01)
*E02F 3/84* (2006.01)
*G08G 1/16* (2006.01)

(52) U.S. Cl.

CPC ............ *E02F 9/262* (2013.01); *E02F 3/7663* (2013.01); *E02F 3/841* (2013.01); *G08G 1/16* (2013.01)

(58) Field of Classification Search

None

See application file for complete search history.

(56) References Cited

U.S. PATENT DOCUMENTS 8,046,132 B2 * 10/2011 Auguet .................. B62D 6/003 701/41
2004/0158355 A1 * 8/2004 Holmqvist ........... G05D 1/0236 701/23
2010/0114430 A1 5/2010 Thomson et al.
2011/0035109 A1 2/2011 Ryerson et al.
2012/0130598 A1 5/2012 Hukkeri et al.

(Continued)

FOREIGN PATENT DOCUMENTS

DE 102005031135 A1 3/2006
DE 102007011180 A1 9/2008

(Continued)

OTHER PUBLICATIONS

German Search Report issued in application No. DE102021208668.3 dated May 3, 2022 (10 pages).

*Primary Examiner* — Christian Chace
*Assistant Examiner* — Scott R Jagolinzer
(74) *Attorney, Agent, or Firm* — Taft Stettinius & Hollister LLP; Stephen F. Rost

(57) ABSTRACT

Detecting a surface irregularity on a surface for a vehicle moving forwardly or rearwardly along the surface, the vehicle having a frame supported by wheels and an implement adjustably coupled to the frame. Two of front and rear steering positions and an implement position are used to determine a path of travel of the vehicle. Surface irregularities of the surface within the path of travel are determined which triggers a warning to the vehicle. The speed of the vehicle can be decreased automatically to stop the vehicle before the vehicle impacts the surface irregularity. A vehicle zone of operation is determined based on the path of travel and a corresponding pair of gridlines is displayed on user interface. The pair of gridlines vary in shape, color, position, and orientation as the path of travel changes. The surface irregularity is illuminated relative to the pair of gridlines on the operator display.

18 Claims, 10 Drawing Sheets

(56) References Cited

U.S. PATENT DOCUMENTS

| | | | | |
|---|---|---|---|---|
| 2013/0192919 | A1* | 8/2013 | Subrt | B62D 6/002 180/400 |
| 2014/0041884 | A1* | 2/2014 | Zhu | E02F 3/765 701/50 |
| 2014/0247328 | A1 | 9/2014 | Popham et al. | |
| 2016/0114831 | A1* | 4/2016 | Laine | G08G 1/168 701/41 |
| 2017/0191243 | A1* | 7/2017 | Sharp | E02F 9/261 |
| 2018/0003516 | A1* | 1/2018 | Khasis | G08G 1/207 |
| 2018/0106014 | A1* | 4/2018 | Horstman | E02F 9/2037 |
| 2020/0180691 | A1* | 6/2020 | Sandblom | B62D 15/0285 |

FOREIGN PATENT DOCUMENTS

| | | | |
|---|---|---|---|
| DE | 102013006464 | A1 | 10/2013 |
| DE | 112013001746 | T5 | 2/2015 |
| DE | 102019211708 | A1 | 2/2020 |
| DE | 102019211801 | A1 | 2/2020 |

* cited by examiner

MOTOR GRADER REAR OBJECT DETECTION PATH OF TRAVEL WIDTH

FIELD OF THE DISCLOSURE

The present disclosure relates to a work vehicle, such as a motor grader, for grading a surface, and in particular to a vehicle control system for detecting an object in a path of travel of the work vehicle in a rearward or forward direction.

BACKGROUND

Work vehicles, such as a motor grader, can be used in construction and maintenance for creating a flat surface at various angles, slopes, and elevations. A motor grader can include two or more axles, with an engine and cab disposed above the axles at the rear end of the vehicle and another axle disposed at the front end of the vehicle. An implement, such as a blade, is attached to the vehicle between the front axle and rear axle.

Motor graders include a drawbar assembly attached toward the front of the grader, which is pulled by the grader as it moves forward. The drawbar assembly rotatably supports a circle drive member at a free end of the drawbar assembly and the circle drive member supports a work implement such as the blade. The angle of the work implement beneath the drawbar assembly can be adjusted by the rotation of the circle drive member relative to the drawbar assembly.

In addition to the blade being rotated about a rotational fixed axis, the blade is also adjustable to a selected angle with respect to the circle drive member. This angle is known as blade slope. The elevation of the blade is adjustable and the lateral position of the blade is also adjustable.

The motor grader includes one or more sensors which measure the orientation of the vehicle with respect to gravity, the location of the wheels, and the location of the blade with respect to the vehicle. A rotation sensor located at the circle drive member provides a rotational angle of the blade with respect to a longitudinal axis defined by a length of the vehicle. A blade slope sensor provides a slope angle of the blade with respect to a lateral axis which is generally aligned with a vehicle lateral axis, such as defined by the vehicle axles. A mainfall sensor provides an angle of travel of the vehicle with respect to gravity.

The motor grader is operated in forward and rearward directions when used. When the motor grader is traveling in the rearward direction in a straight path which is defined with the front wheels being straight or parallel to the direction of travel and the rear axle not articulated such that the rear wheels are straight or parallel to the direction of travel, the operator can easily see a zone or area of detection for potential objects that may be in the path of travel. More often motor graders do not travel rearwardly in a straight path. Instead motor graders typically travel rearward with the front wheels turned and/or the rear axle articulated which increases or widens the zone or area of detection for potential objects. Further since the blade is operable in many different configurations this can also increase the effective width of travel of the motor grader. A wider path of travel of the motor grader increases the zone of detection area which is difficult for the operator to detect any objects in the path of travel.

Therefore, a need exists for detecting objects in response to the rearward movement of the motor grader.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Figure 5:
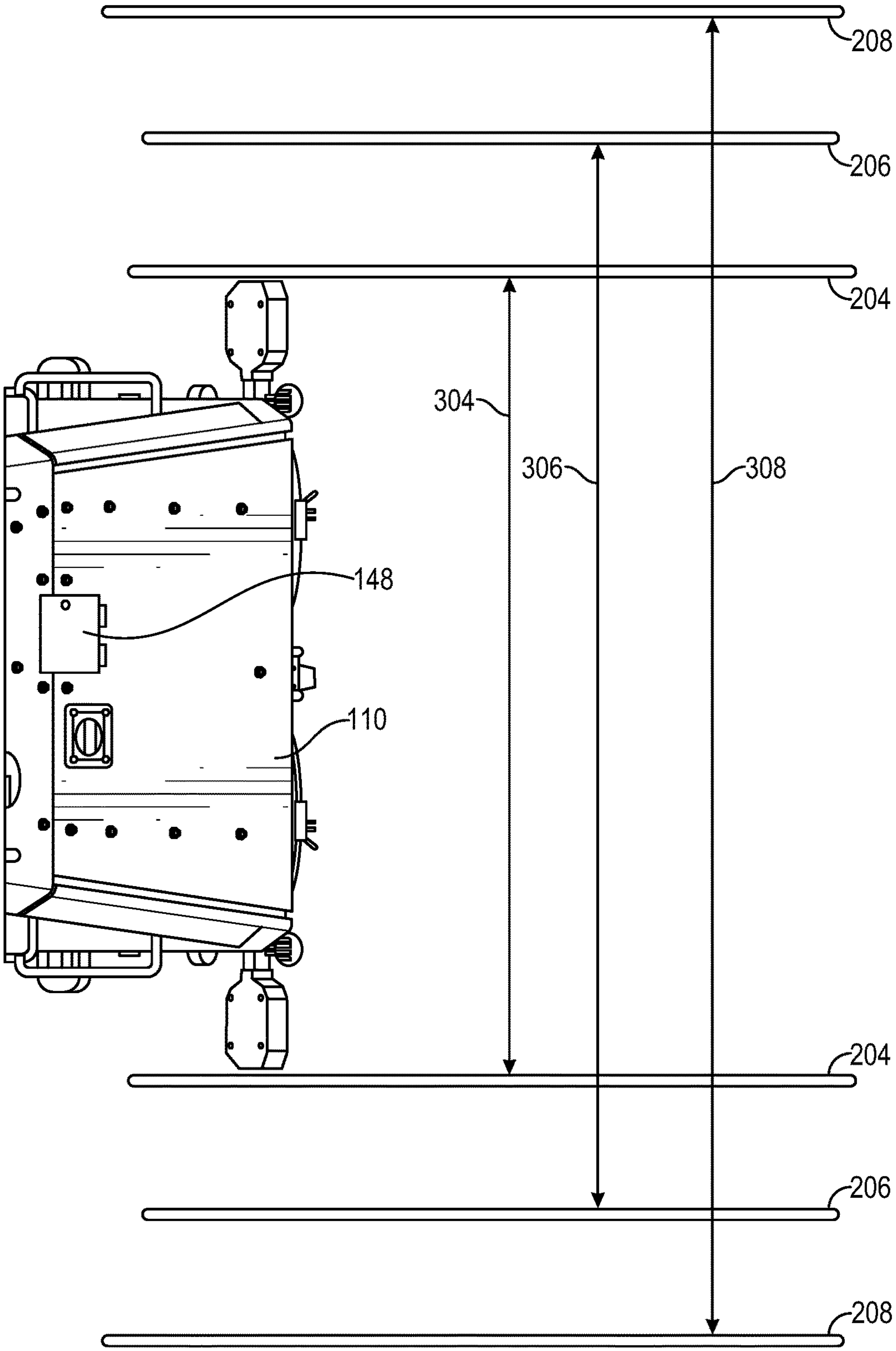
Figure 6:
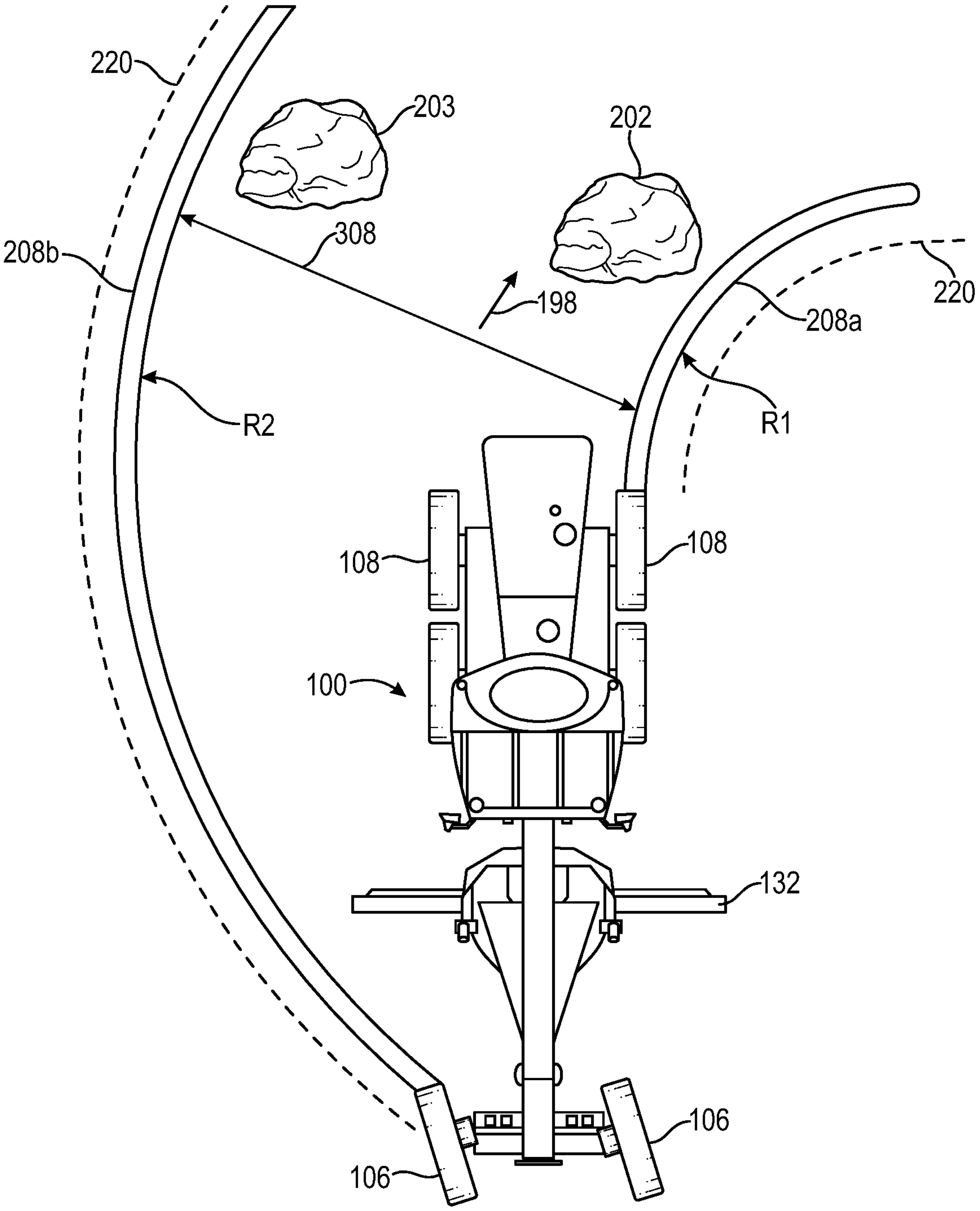
Figure 7:
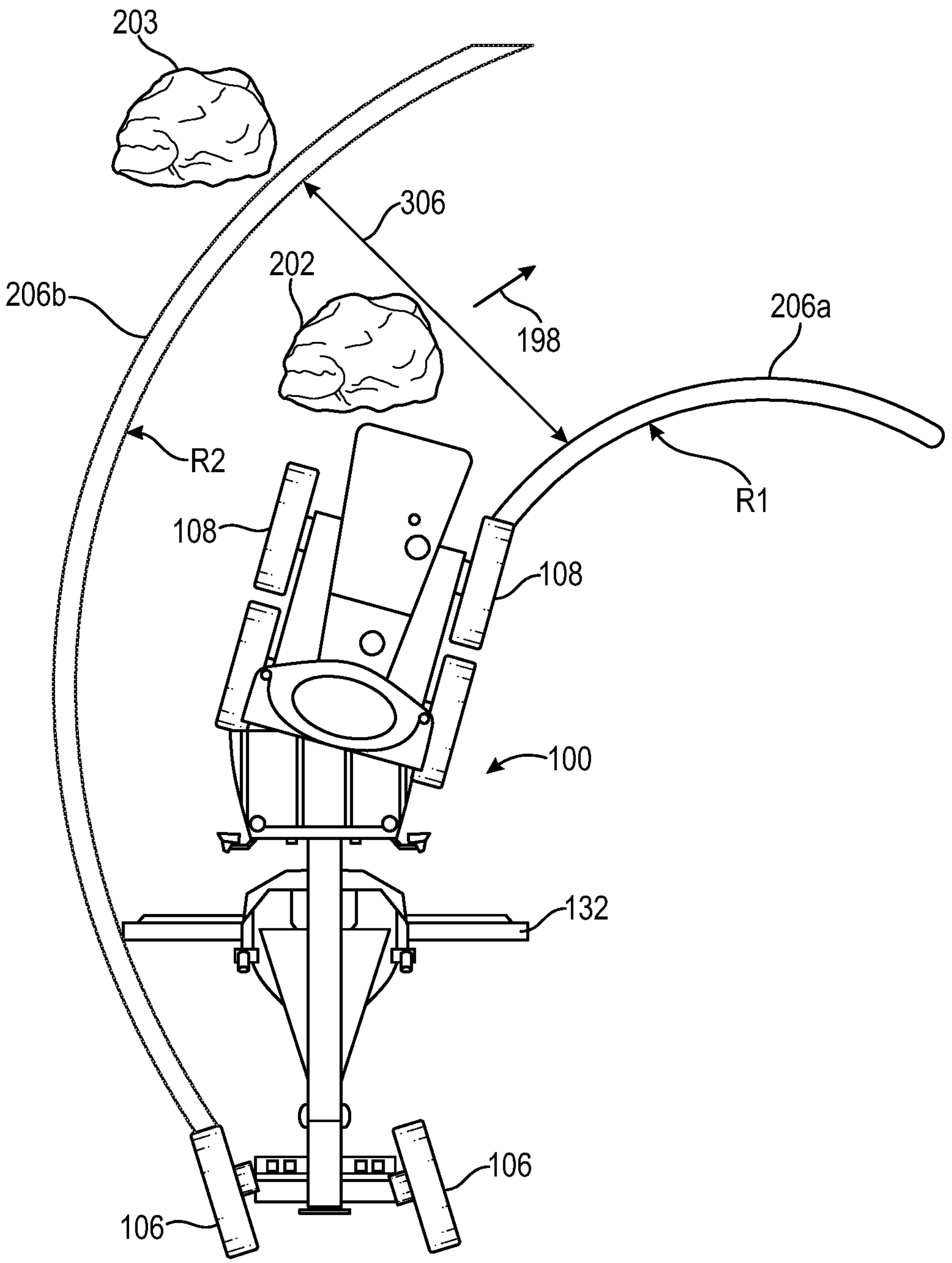
Figure 8:
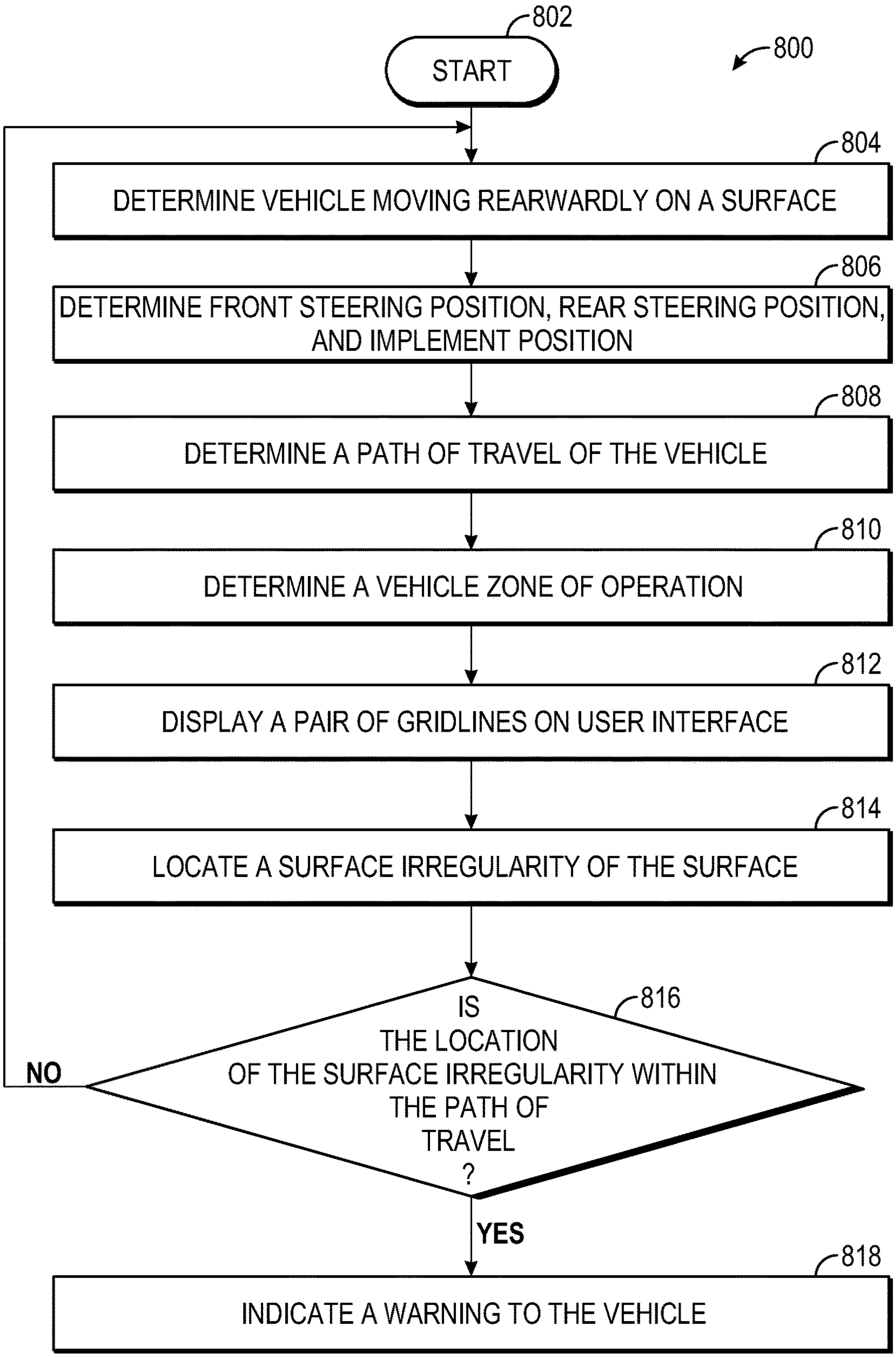

FIG. **4*a*** is a depiction of a motor grader to illustrate front wheel locations (left, straight, right) and rear wheel locations in an articulated left position;

FIG. **4*b*** is a depiction of a motor grader to illustrate front wheel locations (left, straight, right) and rear wheel locations in an articulated straight position;

FIG. **4*c*** is a depiction of a motor grader to illustrate front wheel locations (left, straight, right) and rear wheel locations in an articulated right position;

FIG. 5 is a partial view of the schematic of the motor grader and a narrow configuration, a medium configuration, and a wide configuration of a vehicle zone of operation;

FIG. 6 is a depiction of a motor grader to illustrate the wide configuration of the vehicle zone of operation and the path of travel of the motor grader;

FIG. 7 is a depiction of a motor grader to illustrate the medium configuration of the vehicle zone of operation and the path of travel of the motor grader;

FIG. 8 is a flow diagram of a method to detect a position of a surface irregularity relative to the path of travel of a motor grader.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
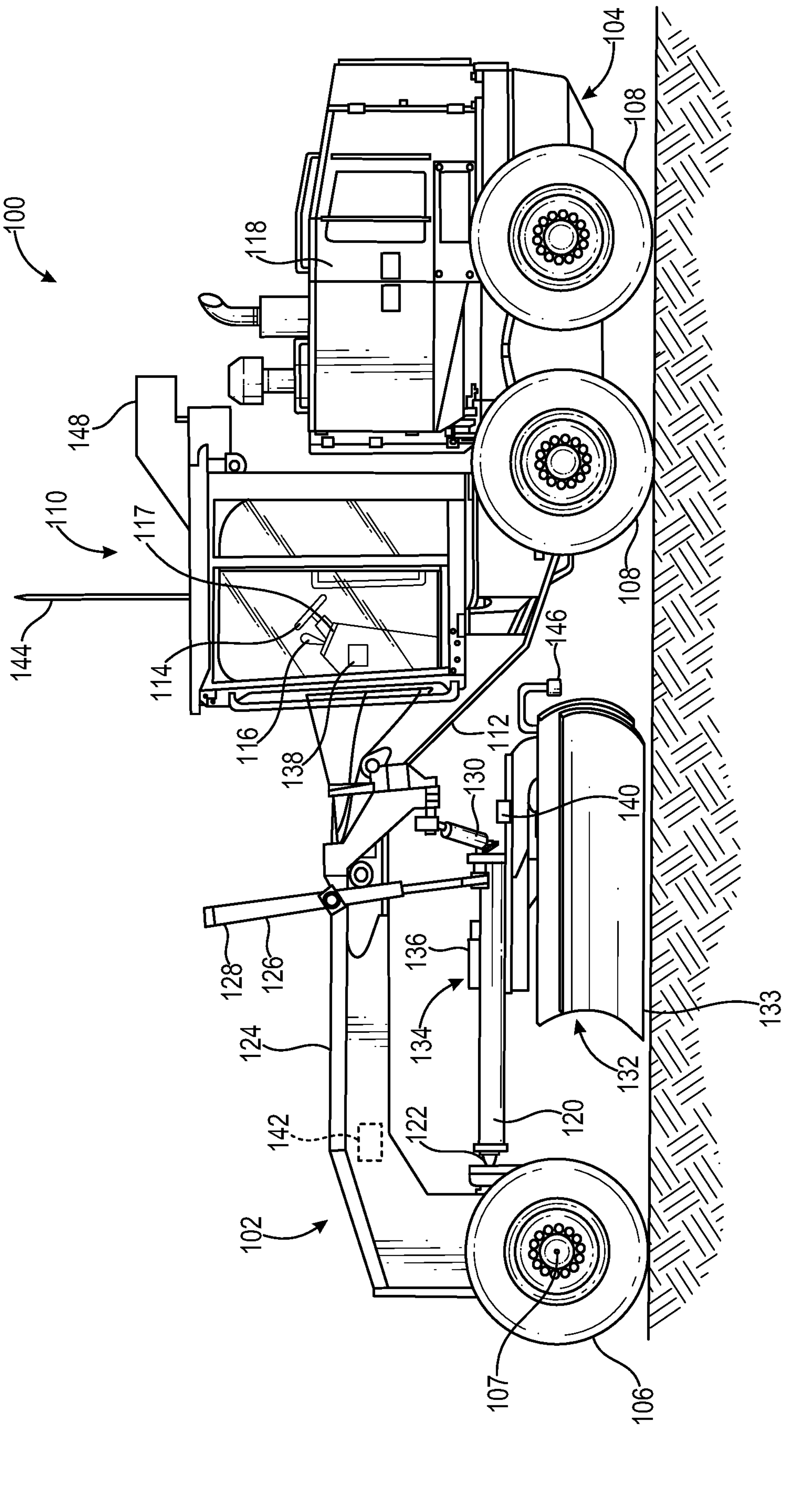
FIG. 1 is a side view of a motor grader.

Referring to FIG. 1, an exemplary embodiment of a vehicle, such as a motor grader 100, is shown. An example of a motor grader is the 772G Motor Grader manufactured and sold by Deere & Company. While the present disclosure discusses a motor grader, other types of work machines are contemplated including graders, road graders, dozers, bulldozers, crawlers, and front loaders. As shown in FIG. 1, the motor grader 100 includes front frame 102 and rear frame 104, with the front frame 102 being supported on a pair of front wheels 106 that are mounted on a front axle 107, and with the rear frame 104 being supported on right and left tandem sets of rear wheels 108. A straight line extending between the wheel centers generally defines a wheel axis transverse to a longitudinal plane of the vehicle 100 and generally parallel to wheel treads in contact with the surface being graded. In one or more embodiments, the front frame 102 and rear frame 104 are fixedly coupled together. In still other embodiment, the front frame 102 and rear frame 104 are moveable with respect to one another such that the front frame 102 and rear frame 104 articulate with respect to one another. Articulation of the vehicle during a grading operation is also known as “crabbing”.

An operator cab 110 is mounted on an upwardly and inclined rear region 112 of the front frame 102 and contains various controls for the motor grader 100 disposed so as to be within the reach of a seated or standing operator. In one aspect, these controls may include a steering wheel 114 and a lever assembly 116. A user interface 117 is supported by a console located in the cab and includes one or more different types of operator controls including manual and electronic buttons of switches. In different embodiments, the user interface 117 includes a visual display providing operator selectable menus for controlling various features of the vehicle 100. In one or more embodiments, a video display is provided to show images provided by an image sensor 148 or cameras located on the vehicle.

An engine 118 is mounted on the rear frame 104 and supplies power for all driven components of the motor grader 100. The engine 118, for example, is configured to drive a transmission (not shown), which is coupled to drive the rear wheels 108 at various selected speeds and either in forward or reverse modes. A hydrostatic front wheel assist transmission (not shown), in different embodiments, is selectively engaged to power the front wheels 106, in a manner known in the art.

Mounted to a front location of the front frame 102 is a drawbar or draft frame 120, having a forward end universally connected to the front frame 102 by a ball and socket arrangement 122 and having opposite right and left rear regions suspended from an elevated central section 124 of the front frame 102. Right and left lift linkage arrangements including right and left extensible and retractable hydraulic actuators 126 and 128, respectively, support the left and right regions of the drawbar 120. The right and left lift linkage arrangements 126 and 128 either raise or lower the drawbar 120. A side shift linkage arrangement is coupled between the elevated frame section 124 and a rear location of the drawbar 120 and includes an extensible and retractable side swing hydraulic actuator 130. A blade or mold board 132 is coupled to the front frame 102 and powered by a circle drive assembly 134. The blade 132 includes an edge 133 configured to cut, separate, or move material. While a blade 132 is described herein, other types of implements are contemplated.

The drawbar 120 is raised or lowered by the right and left lift linkage arrangements 126 and 128 which in turn raises or lowers the blade 132 with respect to the surface. The actuator 130 raises or lowers one end of the blade 132 to adjust the slope of the blade.

The circle drive assembly 134 includes a rotation sensor 136, which in different embodiments, includes one or more switches that detect movement, speed, or position of the blade 132 with respect to the vehicle front frame 102. The rotation sensor 136 is electrically coupled to a controller 138, which in one embodiment is located in the cab 110. In other embodiments, the controller 138 is located in the front frame 102, the rear frame 104, or within an engine compartment housing the engine 118. In still other embodiments, the controller 138 is a distributed controller having separate individual controllers distributed at different locations on the vehicle. In addition, while the controller is generally hardwired by electrical wiring or cabling to sensors and other related components, in other embodiments the controller includes a wireless transmitter and/or receiver to communicate with a controlled or sensing component or device which either provides information to the controller or transmits controller information to controlled devices.

A blade slope/position sensor 140 is configured to detect the slope and/or position of the blade 132 and to provide slope and/or position information to the controller 138. In different embodiments, the blade slope/position sensor 140 is coupled to a support frame for the blade 132 of the hydraulic actuator 130 to provide the slope information. A mainfall sensor 142 is configured to detect the grading angle of the vehicle 100 with respect to gravity and to provide grading angle information to the controller 138. The mainfall sensor 142 is configured to measure one or more of angles of slope, tilt, elevation, or depression with respect to gravity. In one embodiment, the mainfall sensor 142 includes an inertial measurement unit (IMU) configured to determine a roll position and a pitch position with respect to gravity. In other embodiments, the mainfall sensor includes other inclination measuring devices for measuring an angle of the vehicle, such as an inclinometer. The mainfall sensor 142 provides a signal including roll and pitch information of the straightline axis between wheel centers and consequently roll and pitch information of the vehicle 100. The roll and pitch information is used by the ECU 150 to adjust the position of the blade 132.

In other embodiments, the vehicle 100 includes angle sensors at both the front frame 102 and the rear frame 104 to determine the position of the front frame 102 with respect to the rear frame 104 during articulation. In these embodiments, grade control is achieved using one or more of implement position, front frame position, and rear frame position.

An antenna 144 is located at a top portion of the cab 110 and is configured to receive signals from different types of machine control systems including sonic systems, laser systems, and global positioning systems (GPS). While the antenna 144 is illustrated, other locations of the antenna 144 are included as is known by those skilled in the art. For instance, when the vehicle 100 is using a sonic system, a sonic tracker 146 is used to detect reflected sound waves transmitted by the sonic system with the sonic tracker 146. In a vehicle 100 using a laser system, a mast (not shown) located on the blade supports a laser tracker located at a distance above the blade 132. In one embodiment, the mast includes a length to support a laser tracker at a height similar to the height of a roof of the cab. A GPS system includes a GPS tracker located on a mast similar to that provided for the laser tracker system. Consequently, the present disclosure applies vehicle motor grader systems using both relatively "simple" 2D cross slope systems and to "high end" 3D grade control systems.

In additional embodiments, the grade control system includes devices, apparatus, or systems configured to determine the mainfall of the vehicle, as well as devices, apparatus, or systems configured to determine the slope and/or the position of the blade. For instance, blade position is determined by one or more sensors. In one embodiment, an inertial measurement unit is used to determine blade position. Consequently, other systems to determine mainfall and blade slope/position are contemplated.

A ground image sensor 148 is fixedly mounted to the cab 110 at a location generally unobstructed by any part of the vehicle 100. The ground image sensor 148 includes one or more of a transmitter, receiver, or a transceiver directed to the ground rearward of and being approached by the vehicle 100 when the vehicle 100 is traveling in a rearward or forward direction as indicated by path 198. In different embodiments, the ground image sensor 148 includes one or more of a two dimensional camera, a radar device, and a laser scanning device, and a light detection and ranging (LIDAR) scanner. The ground image sensor 148 is configured to provide an image of the ground and any surface irregularities 202, 203 being approached which is transmitted to an electronic control unit (ECU) 150 of FIG. 2. In different embodiments, the ground image sensor 148 is one of a grayscale sensor, a color sensor, or a combination thereof.

Figure 2:
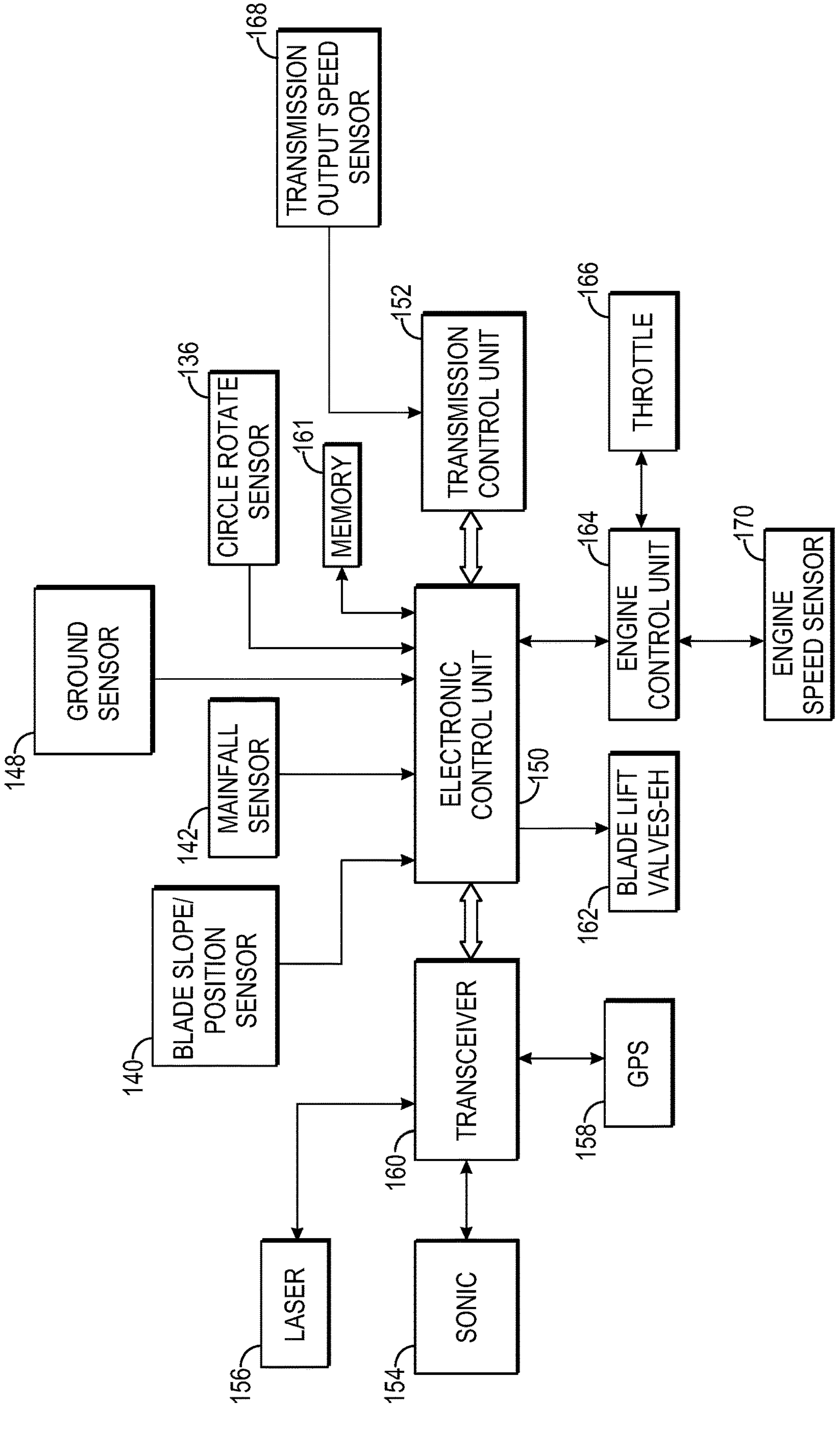
FIG. 2 is a simplified schematic diagram of a vehicle and a vehicle grade control system of the present disclosure.

FIG. 2 is a simplified schematic diagram of the vehicle 100 and a vehicle grade control system embodying the invention. In this embodiment, the controller 138 is configured as the ECU 150 operatively connected to a transmission control unit 152. The ECU 150 is located in the cab 110 of vehicle 100 and the transmission control unit 152 is located at the transmission of the vehicle 100. The ECU 150 receives slope, angle, and/or elevation signals generated by one or more types of machine control systems including a sonic system 154, a laser system 156, and a GPS system 158. Other machine control systems are contemplated. These signals are collectively identified as contour signals. Each of the machine control systems 154, 156, and 158 communicates with the ECU 150 through a transceiver 160 which is operatively connected to the appropriate type of antenna as is understood by those skilled in the art.

The ECU 150, in different embodiments, includes a computer, computer system, or other programmable devices. In other embodiments, the ECU 150 can include one or more processors (e.g. microprocessors), and an associated memory 161, which can be internal to the processor of external to the processor. The memory 161 can include random access memory (RAM) devices comprising the memory storage of the ECU 150, as well as any other types of memory, e.g., cache memories, non-volatile or backup memories, programmable memories, or flash memories, and read-only memories. In addition, the memory can include a memory storage physically located elsewhere from the processing devices and can include any cache memory in a processing device, as well as any storage capacity used as a virtual memory, e.g., as stored on a mass storage device or another computer coupled to ECU 150. The mass storage device can include a cache or other dataspace which can include databases. Memory storage, in other embodiments, is located in the "cloud", where the memory is located at a distant location which provides the stored information wirelessly to the ECU 150.

The ECU 150 executes or otherwise relies upon computer software applications, components, programs, objects, modules, or data structures, etc. Software routines resident in the included memory of the ECU 150 or other memory are executed in response to the signals received. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user. The ECU 150 is configured to execute the stored program instructions.

The ECU 150 is also operatively connected to a blade lift valves assembly 162 (see FIG. 2) which is in turn operatively connected to the right and left lift linkage arrangements 126 and 128 and the actuator 130. The blade lift valves assembly 162, in one embodiment, is an electrohydraulic (EH) assembly which is configured to raise or lower the blade 132 with respect to the surface or ground and to one end of the blade to adjust the slope of the blade. In different embodiments, the valve assembly 162 is a distributed assembly having different valves to control different positional features of the blade. For instance, one or more valves adjust one or both of the linkage arrangements 126 and 128 in response to commands generated by and transmitted to the valves and generated by the ECU 150. Another one or more valves, in different embodiments, adjusts the actuator 130 in response to commands transmitted to the valves and generated by the ECU 150. The ECU 150 responds to grade status information, provided by the sonic system 154, the laser system 156, and the GPS 158, and adjusts the location of the blade 132 through control of the blade lift valves assembly 162. The location of the blade is adjusted based on the current position of the blade with respect to the vehicle, speed of blade if being manipulated, and the direction of the blade. Alternatively, the ECU 150 also responds to operator input to adjust the location of the blade 132.

To achieve better productivity and to reduce operator error, the ECU 150 is coupled to the transmission control unit 152 to control the amount of power applied to the wheels of the vehicle 100. The ECU 150 is further operatively connected to an engine control unit 164 which is, in part, configured to control the engine speed of the engine 116. A throttle 166 is operatively connected to the engine control unit 164. In one embodiment, the throttle 166 is a manually operated throttle located in the cab 110 which is adjusted by the operator of vehicle 100. In another embodiment, the throttle 166 is additionally a machine controlled throttle which is automatically controlled by the ECU 150 in response to grade information and vehicle speed information.

Figure 4A:
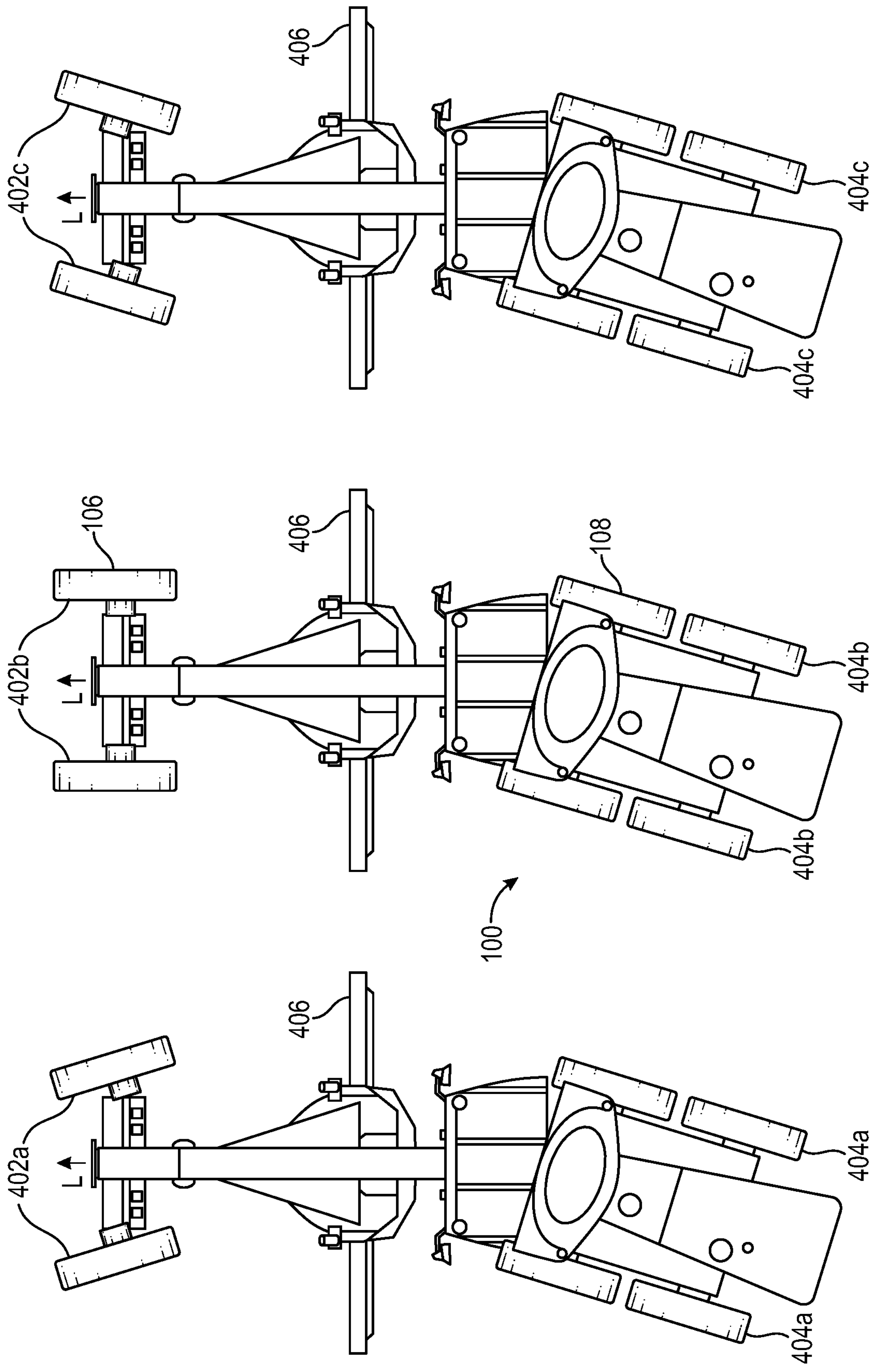
Figure 4B:
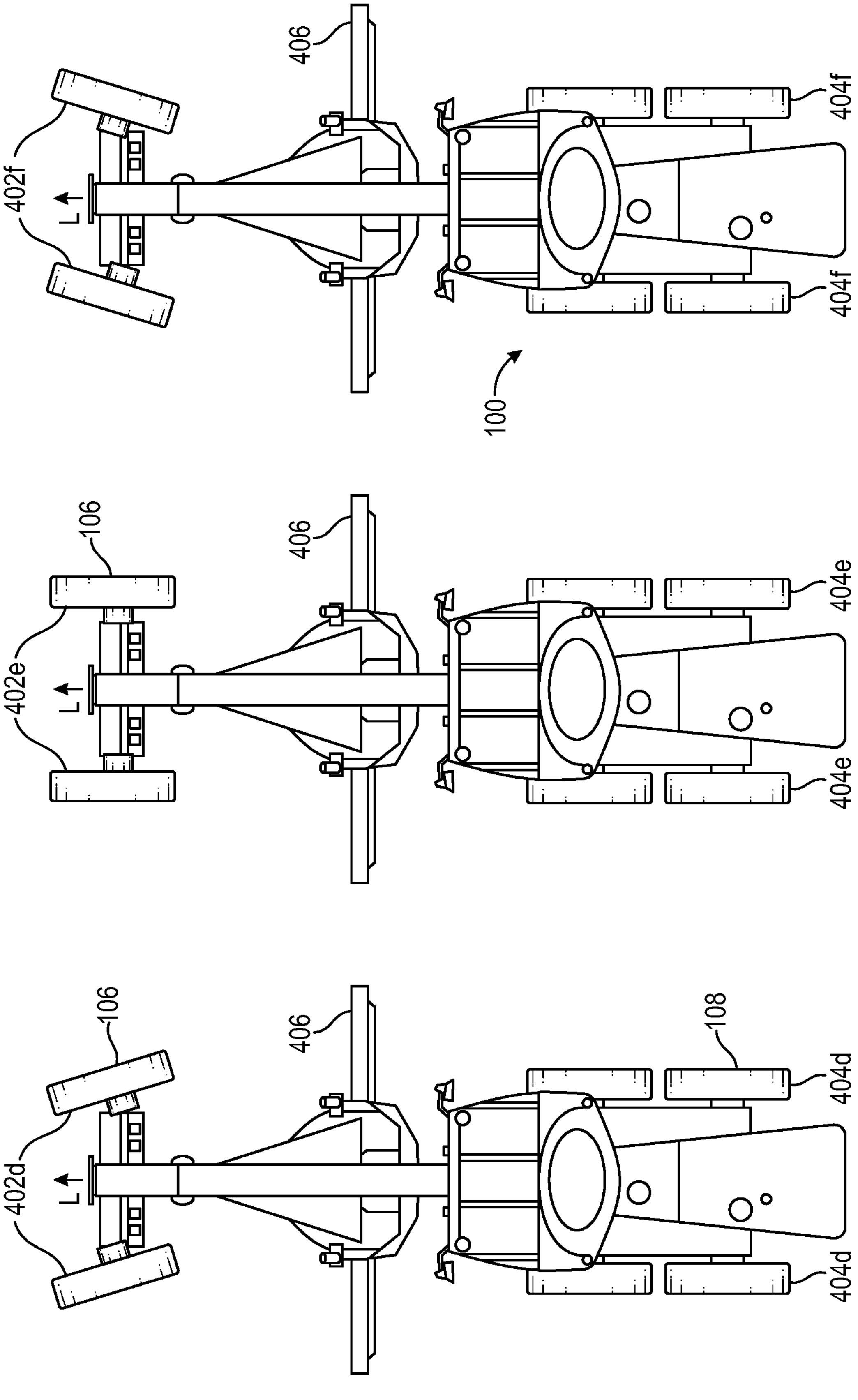
Figure 4C:
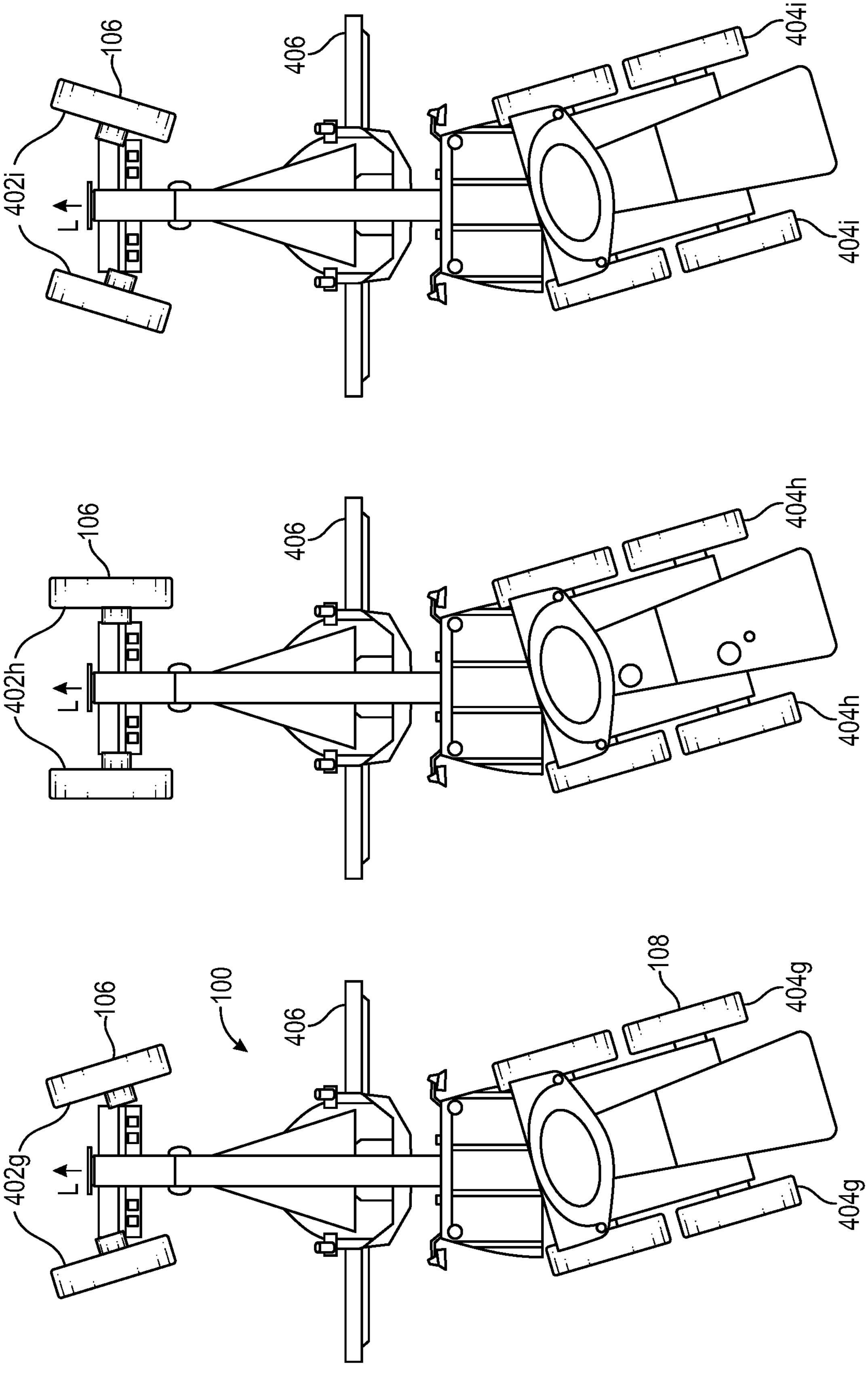

The ECU 150 provides engine control instructions to the engine control unit 164 and transmission control instruction to the transmission control unit 152 to adjust the speed of the vehicle in response to front wheel location inputs 402*a*-402*i* (FIGS. 4*a*, 4*b*, 4*c*), rear wheel location inputs 404*a*-404*i* (FIGS. 4*a*, 4*b*, 4*c*), blade or implement position input 406 (FIGS. 4*a*, 4*b*, 4*c*), and surface irregularity detection information provided by one of the machine control systems including the sonic system 154, the laser system 156, the GPS system 158, and the ground image sensor 148. In other embodiments, other machine control systems are used. Vehicle direction information is determined by the ECU 150 in response to direction information provided by the steering device 114.

Vehicle speed information is provided to the ECU 150, in part, by the transmission control unit 152 which is operatively connected to a transmission output speed sensor 168. The transmission output speed sensor 168 provides a sensed speed of an output shaft of the transmission, as is known by those skilled in the art. Additional transmission speed sensors are used in other embodiments including an input transmission speed sensor which provides speed information of the transmission input shaft.

Additional vehicle speed information is provided to the ECU 150 by the engine control unit 164. The engine control unit 164 is operatively connected to an engine speed sensor 170 which provides engine speed information to the engine control unit 164.

A current vehicle speed is determined at the ECU 150 using speed information provided by one of or both of the transmission control unit 152 and the engine control unit 164. The speed of the vehicle 100 is decreased or increased by speed control commands provided by the ECU 150.

Figure 3:
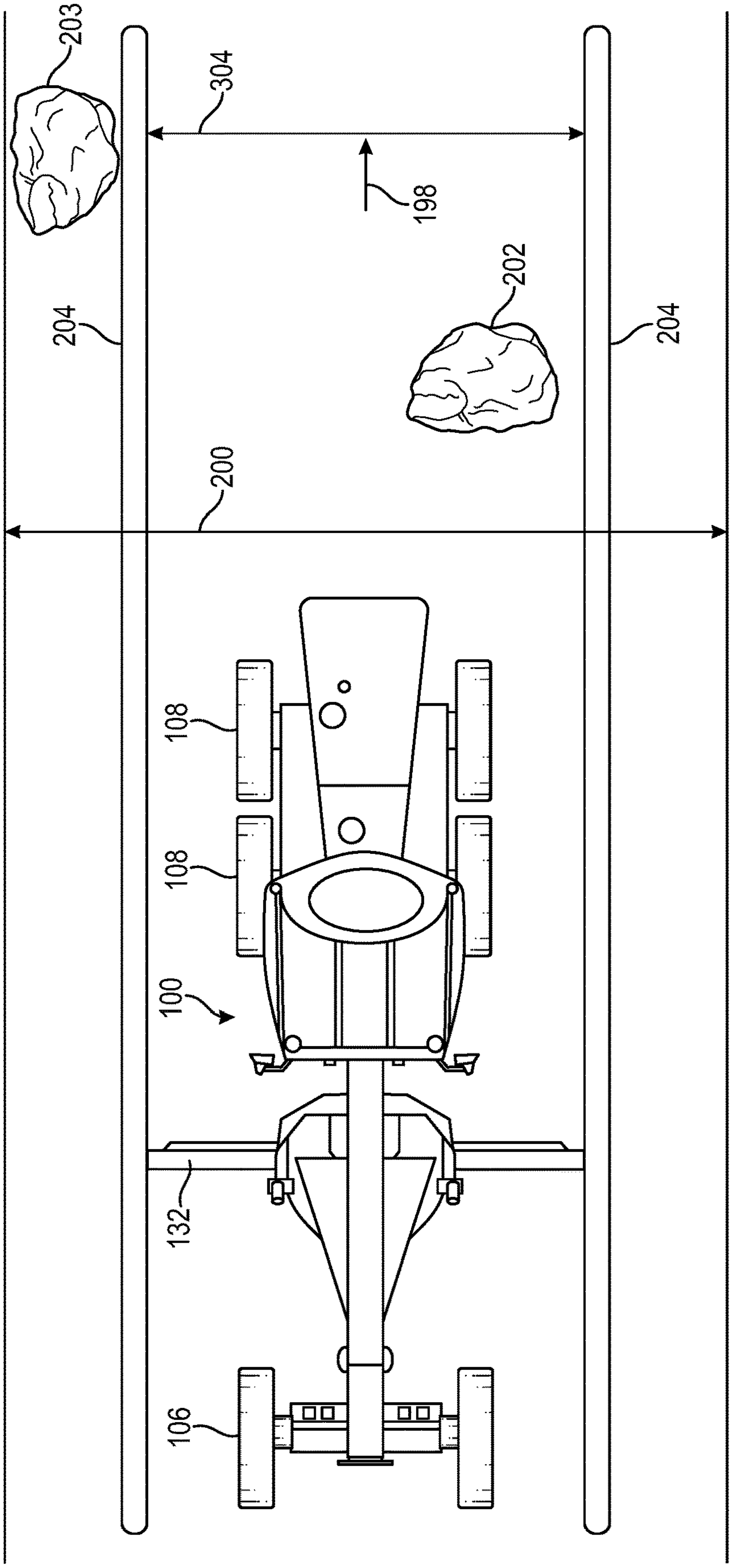
FIG. 3 is a schematic of a motor grader moving in a rearward direction with an object in the path of travel.

FIG. 3 illustrates the vehicle 100 moving along a path 198 of a surface 200 in a rearward direction towards a surface protrusion or object 202. It is contemplated that the vehicle 100 can also move in a forward direction towards a surface irregularity 202 and the same disclosure of the present application is applicable for movement of the vehicle 100 in a forward direction. As the vehicle moves along the path, the ground image sensor 148 provides images of the surface 200 located behind the vehicle 100, i.e., in a rearward direction. During this rearward movement, the surface 200 (including the irregularities), is imaged by the ground sensor 148 and the images are transmitted to the EDU 150. A field of view of the ground image sensor 148 includes a width, in at least one embodiment, sufficient to provide a view of one or more upcoming surface irregularities 202. Surface irregularity 202 is any protrusion, object, obstacle, bump, or even a person that is generally elevated above the surface 200 and can be of a size that is within a contact zone of the vehicle or not within a contact zone of the vehicle. For the purposes of this disclosure, the irregularities are deviations from the ground surface.

As the vehicle 100 moves along the path 198, the front wheels 106 correspond to a front steering position, the rear wheels 108 correspond to a rear steering position, and the implement or blade 132 corresponds to an implement position relative to the surface. At least two of the front steering position, rear steering position, and the implement position determine a path of travel 204 of the vehicle 100. The ECU 150 receives the location of the surface irregularities 202, 203 and determines the location of the surface irregularities 202, 203 relative to the path of travel 204 of the vehicle 100. The ECU 150 determines the location of the surface irregularity 202 is within the path of travel 204, and the ECU 150 determines the location of the surface irregularity 203 is not within the path of travel 204 of the vehicle 100. The ECU 150 also determines a vehicle zone of operation 304 using at least two of the front steering position, the rear steering position, and the implement position.

Illustrated in FIGS. **4*a*-4*c* are different positions of the front wheels 106, the rear wheels 108, and the blade 132. As discussed previously, the front frame 102 and rear frame 104 can be fixedly coupled together or the front frame 102 and rear frame 104 are moveable with respect to one another such that the front frame 102 and rear frame 104 articulate with respect to one another. The ECU 150 also determines the front steering position by identifying a first and a second front wheel location input that respectively corresponds to the first and the second front wheel 106. The ECU 150 also determines the rear steering position by identifying a first and a second rear wheel location input that respectively corresponds to the first and the second rear wheel. The ECU 150 also determines the implement position by identifying a position of the implement or blade 132 with respect to the front frame 102 or the rear frame 104 of the vehicle 100**.

FIG. **4*a* illustrates front wheel location inputs 402*a*-402*c* and rear wheel location inputs 404*a*-404*c* of the vehicle 100. Front wheel location input 402*a* corresponds to the front wheels 106 turned left or rotated counterclockwise relative to a longitudinal centerline L of the front axle 107. Front wheel location input 402*b* corresponds to the front wheels 106 being parallel to the longitudinal centerline L. Front wheel location input 402*c* corresponds to the front wheels 106 turned right or rotated clockwise relative to the longitudinal centerline L of the front axle 107. In all of these positions, the rear wheels 108 are positioned in an articulated left position wherein the rear frame 104 is articulated with respect to the front frame 102 in a clockwise direction relative to the longitudinal centerline L. An implement location input 406 corresponds to the position of the blade 132 with respect to the front frame 102 or the rear frame 104 of the vehicle 100**.

FIG. **4*b* illustrates front wheel location inputs 402*d*-402*f* and rear wheel location inputs 404*d*-404*f* of the vehicle 100. Front wheel location input 402*d* corresponds to the front wheels 106 turned left or rotated counterclockwise relative to a longitudinal centerline L of the front axle 107. Front wheel location input 402*e* corresponds to the front wheels 106 being parallel to the longitudinal centerline L. Front wheel location input 402*f* corresponds to the front wheels 106 turned right or rotated clockwise relative to the longitudinal centerline L of the front axle 107. In all of these positions, the rear wheels 108 are positioned in an articulated straight position wherein the rear frame 104 is aligned with the front frame 102 substantially parallel to the longitudinal centerline L. An implement location input 406 corresponds to the position of the blade 132 with respect to the front frame 102 or the rear frame 104 of the vehicle 100**.

FIG. **4*c* illustrates front wheel location inputs 402*g*-402*i* and rear wheel location inputs 404*g*-404*i* of the vehicle 100. Front wheel location input 402*g* corresponds to the front wheels 106 turned left or rotated counterclockwise relative to a longitudinal centerline L of the front axle 107. Front wheel location input 402*h* corresponds to the front wheels 106 being parallel to the longitudinal centerline L. Front wheel location input 402*i* corresponds to the front wheels 106 turned right or rotated clockwise relative to the longitudinal centerline L of the front axle 107. In all of these positions, the rear wheels 108 are positioned in an articulated right position wherein the rear frame 104 is articulated with respect to the front frame 102 in a counterclockwise direction relative to the longitudinal centerline L. An implement location input 406 corresponds to the position of the blade 132 with respect to the front frame 102 or the rear frame 104 of the vehicle 100**.

FIG. 5 illustrates the path of travel 204 of the vehicle 100 that corresponds to the vehicle zone of operation 304, the path of travel 206 of the vehicle 100 that corresponds to the vehicle zone of operation 306, and the path of travel 208 of the vehicle 100 that corresponds to the vehicle zone of operation 308. The ECU 150 determines the appropriate one of the path of travel 204, 206, and 208 using at least two of the front steering position, the rear steering position, and the implement position to thereby determine the appropriate one of the vehicle zone of operation 304, 306, and 308. The vehicle zone of operation 304 corresponds to a narrow configuration, the vehicle zone of operation 306 corresponds to a medium configuration, and vehicle zone of operation 308 corresponds to a wide configuration. The vehicle zone of operation 304 can also dynamically change.

Turning now to FIG. 6, is a depiction of the vehicle 100 that is traveling rearwardly with the front wheels 106 turned left or rotated counterclockwise relative to a longitudinal centerline L of the front axle 107. The rear wheels 108 are positioned in an articulated straight position wherein the rear frame 104 is aligned with the front frame 102 substantially parallel to the longitudinal centerline L. An implement location input 406 corresponds to the position of the blade 132 with respect to the front frame 102 or the rear frame 104 of the vehicle 100. Illustrated in FIG. 6, the effective width of the path of travel **208*a*-208*b* widens and therefore additional surface irregularities such as surface irregularity 203 are within the vehicle zone of operation 308 which is now in a wide configuration. The ECU 150 now determines the location of the surface irregularities 202 and 203 are both within the path of travel 208*a*-208*b* and the zone of operation 308 of the vehicle 100. The path of travel line 208*a* has a first radius R1 and the path of travel line 208***b* has a second radius R2, wherein the first radius is different than the second radius.

FIG. 7 is a depiction of the vehicle 100 that is traveling rearwardly with the front wheels 106 turned left or rotated counterclockwise relative to a longitudinal centerline L of the front axle 107. The rear wheels 108 are positioned in an articulated left position wherein the rear frame 104 is articulated with respect to the front frame 102 in a clockwise direction relative to the longitudinal centerline L. An implement location input 406 corresponds to the position of the blade 132 with respect to the front frame 102 or the rear frame 104 of the vehicle 100. Illustrated in FIG. 7, the effective width of the path of travel 206*a*-206*b* narrows from the effective width of the path of travel 208*a*-208*b* and therefore other surface irregularities may be present. In this situation, surface irregularity 203 is no longer within the vehicle zone of operation 306 however surface irregularity 202 is within the vehicle zone of operation 306 which is now in a medium configuration. The ECU 150 now determines the location of the surface irregularity 202 is within the path of travel 206*a*-206*b* and the zone of operation 306 however surface irregularity 203 is not within the path of travel 206*a*-206*b* and the zone of operation 306 of the vehicle 100. The path of travel line 206*a* has a first radius R1 and the path of travel line 206*b* has a second radius R2, wherein the first radius is different than the second radius.

In all of the FIGS. 1-7, the blade 132 is illustrated in a narrow configuration. As one of ordinary skill can appreciate, the blade 132 can be configured in multiple different ways and the implement location input 406 varies accordingly. For example, the blade 132 can slide laterally which increases the overall effective width of vehicle 100 and also increases the path of travel 204, 206, 208 and the corresponding vehicle zones of operation 304, 306, and 308. As can be appreciated, the blade 132 can move to a wide out position which is the maximum distance the blade 132 can move laterally.

FIG. 8 illustrates a flow diagram of a process 800 to detect one or more surface irregularities 202, 203 within the path of travel and/or vehicle zone of operation. Initially, the process 800 includes a start procedure 802 which begins based on an operator input or a vehicle input. For instance, the operator begins a rearward movement of the vehicle 100 by providing an input to the user interface 117, such as a gear shift into reverse. The ECU 150 determines at block 804 that the vehicle 100 is moving in a rearward direction. The ECU 150 determines at block 806 the front steering position, the rear steering position, and the implement position relative to the surface. The front steering position includes identifying a first and a second front wheel location input that respectively corresponds to the first and the second front wheel. The rear steering position includes identifying a first and a second rear wheel location input that respectively corresponds to the first and the second rear wheel. The implement position includes identifying an implement location input that corresponds to a location of the implement with respect to the frame of the vehicle.

The ECU 150 determines at block 808 a path of travel 204, 206, or 208, or any other path of travel of the vehicle 100 based on at least two of the front steering position, the rear steering position, and the implement position.

The ECU 150 determines a vehicle zone of operation 304, 306, 308 using the path of travel of the vehicle 100 at block 808. At block 812, the ECU 150 also displays a pair of gridlines on the user interface 117, wherein the pair of gridlines is based on the vehicle zone of operation 304, 306, 308 and the path of travel 204, 206, 208 of the vehicle 100. The ECU 150 can adjust the pair of gridlines on the user interface 117 when the vehicle zone of operation changes from one of the narrow, medium, or wide configurations to another of the narrow, medium, or wide configurations. Alternatively or additionally, the ECU 150 can dynamically adjust the pair of gridlines on the user interface 117 that corresponds to a change in the vehicle zone of operation. In some embodiments, the pair of gridlines has a unique color associated with each of the narrow, medium, and wide configurations as displayed on the user interface 117. In other embodiments, the pair of gridlines is a constant color in any of the narrow, medium, and wide configurations or as the pair of gridlines changes dynamically. The pair of gridlines are curved or straight on the user interface 117. In some embodiments, the surface irregularity 202, 203 is illuminated relative to the pair of gridlines on the user interface 117. The distance between the pair of gridlines can therefore widen and narrow on the user interface 117 and are displayed over any of the surface irregularities 202, 203.

As the vehicle 100 moves along the path 198, the sensor 148 generates image data which is transmitted to the ECU 150. The ECU 150 is configured to process the received image data to determine the location and size of any surface irregularities 202, 203 including length, height, depth, and distance to the irregularity. The ECU 150 determines the upcoming or anticipated ground contour with the image sensor 148 that can include surface irregularities 202, 203. The memory 161 includes, in one or more embodiments, an object detector and an edge detector. The object detector and edge detector are each software applications or program code which are used by the processor ECU 150 to determine the content of the images transmitted by the image sensor 148 at block 220. The object detector is configured to determine the location of objects, irregularities 202, 203, found in the images and the edge detector is configured to determine the relationship between the objects found in the images. Distance of the vehicle 100, and particularly the blade 132 to the irregularities 202, 203 is also determined. Object detection software and edge detector software that determine the features appearing in the images are known by those skilled in the art.

Using one or more of the identified objects, edges, and distances, irregularities 202, 203, the location of the surface irregularities 202, 203 is determined by the ECU 150 at block 814. The ECU 150 is further configured to determine, based on the received image content, whether the irregularities are within the path of travel 204, 206, 208 or the vehicle zone of operation 304, 306, 308 at block 816. In some forms, the ECU 150 can determine if a size of the surface irregularity 202, 203 is within a contact zone of the vehicle 100 that is defined as any portion of the vehicle 100 that would contact the surface irregularity 202, 203, if the vehicle 100 continues traveling toward it. If the surface irregularities 202, 203 are within the path of travel, the ECU 150 indicates a warning to the vehicle 100 at block 818. If not, then warnings to the vehicle 100 are suspended based on the determined location of the surface irregularity 202, 203 outside the path of travel of the vehicle 100. As such, the operator is only alerted of objects or surface irregularities that are within the path of travel of the vehicle 100 and could thereby cause damage to the vehicle 100. For any objects outside the path of travel, then no warning signals are displayed and the operator continues to operate the vehicle 100. In some embodiments, the ECU 150 may include a buffer zone 220 (FIG. 6) which is an area if object or surface irregularity 202, 203 is too close to then the ECU 150 will send a warning to the user interface 117.

In some forms, the ECU 150 adjusts or decreases a speed of the vehicle 100 by automatically engaging the brakes based on the determined location of the surface irregularity 202, 203 within the path of travel of the vehicle 100. In some embodiments, if the vehicle 100 is moving at a slower speed then a shorter stopping distance will used, however if the vehicle 100 is moving at a higher or faster speed then a longer stopping distance will be used.

In one embodiment of the application, a method of detecting a surface irregularity on a surface for a vehicle moving along the surface, the vehicle having a frame supported by wheels and an implement adjustably coupled to the frame, the method comprising: receiving at least two of the following: a front steering position, a rear steering position, and an implement position relative to the surface while the vehicle moves along the surface; determining a path of travel of the vehicle based on the front steering position, the rear steering position, and the implement position; locating a surface irregularity of the surface; determining the location of the surface irregularity relative to the path of travel of the vehicle; and indicating a warning to the vehicle based on the determined location of the surface irregularity within the path of travel of the vehicle.

In one form of the method, the wheels include a first and a second front wheel, and the receiving the front steering position includes identifying a first and a second front wheel location input that respectively corresponds to the first and the second front wheel.

In one form of the method, the wheels include a first and a second rear wheel, and the receiving the rear steering position includes identifying a first and a second rear wheel location input that respectively corresponds to the first and the second rear wheel.

In one form of the method, the determining the implement position includes identifying an implement location input that corresponds to a location of the implement with respect to the frame of the vehicle.

In one form of the method, further comprising determining a vehicle zone of operation using the path of travel; and displaying a pair of gridlines on an operator display based on the vehicle zone of operation and the path of travel of the vehicle.

In one form of the method, the vehicle zone of operation includes one of a narrow configuration, a medium configuration, and a wide configuration; and adjusting the pair of gridlines on the operator display when the vehicle zone of operation changes from one of the narrow, medium, or wide configurations to another of the narrow, medium, or wide configurations.

In one form of the method, further comprising: adjusting the pair of gridlines on the operator display as the vehicle zone of operation dynamically changes.

In one form of the method, further comprising: illuminating the surface irregularity relative to the pair of gridlines on the operator display.

In one form of the method, further comprising: suspending any warnings to the vehicle based on the determined location of the surface irregularity outside the path of travel of the vehicle.

In another embodiment of the application, a method of operating a vehicle moving along a surface, the vehicle having a frame supported by wheels and an implement adjustably coupled to the frame, the method comprising: receiving at least two of the following: a front steering position, a rear steering position, and an implement position relative to the surface while the vehicle moves along the surface; determining a path of travel of the vehicle based on the front steering position, the rear steering position, and the implement position; determining a vehicle zone of operation using the path of travel; and displaying a pair of gridlines on an operator display based on the vehicle zone of operation and the path of travel of the vehicle.

In one form of the method, further comprising: adjusting the pair of gridlines on the operator display as the vehicle zone of operation dynamically changes.

In one form of the method, the pair of gridlines includes a first gridline having a first radius and a second gridline having a second radius, wherein the first radius is different than the second radius.

In one form of the method, further comprising: locating a surface irregularity of the surface; determining the location of the surface irregularity relative to the path of travel of the vehicle; and indicating a warning to the vehicle based on the determined location of the surface irregularity within the path of travel of the vehicle.

In one form of the method, further comprising: suspending any warnings to the vehicle based on the determined location of the surface irregularity is outside the path of travel of the vehicle.

In one form of the method, wherein the determining the location of the surface irregularity includes determining a size of the surface irregularity is within a contact zone of the vehicle.

In one form of the method, further comprising: adjusting a speed of the vehicle based on the determined location of the surface irregularity within the path of travel of the vehicle.

In yet another embodiment of the application, a method of operating a vehicle moving along a surface, the vehicle having a frame supported by wheels and an implement adjustably coupled to the frame, the method comprising: receiving at least two of the following: a front steering position, a rear steering position, and an implement position relative to the surface while the vehicle moves along the surface; determining a path of travel of the vehicle based on the front steering position, the rear steering position, and the implement position; locating a surface irregularity of the surface; determining the location of the surface irregularity relative to the path of travel of the vehicle; and adjusting a speed of the vehicle based on the determined location of the surface irregularity within the path of travel of the vehicle.

In one form of the method, further comprising: determining a vehicle zone of operation using the path of travel; and displaying a pair of gridlines on an operator display based on the vehicle zone of operation and the path of travel of the vehicle.

In one form of the method, further comprising: adjusting the pair of gridlines on the operator display as the vehicle zone of operation dynamically changes.

In one form of the method, further comprising: indicating a warning to the vehicle based on the determined location of the surface irregularity within the path of travel of the vehicle.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A method of detecting a surface irregularity on a surface for a motor grader moving rearwardly, the method comprising:

detecting an articulation angle of a rear frame of the motor grader relative to a front frame of the motor grader via at least one sensor coupled to at least one of the front frame and the rear frame, wherein the front frame is supported by a first pair of wheels including a first and a second front wheel and the rear frame is supported by a second pair of wheels including a first and a second rear wheel;

detecting a blade position that corresponds to a position of a blade relative to the front frame, wherein the blade is located between the first pair of wheels and the second pair of wheels and adjustably coupled to and positioned below the front frame;

determining a front steering position based on a first and second front wheel location input corresponding to an angle of the first and the second front wheel relative to the front frame;

determining a rear steering position based on a first and second rear wheel location input corresponding to the detected articulation angle of the rear frame relative to the front frame;

determining, by an electronic control unit, a path of travel of the motor grader along the surface based on, the front steering position, the rear steering position, and the detected blade position;

locating, by a ground image sensor operatively coupled with the electronic control unit, a surface irregularity of the surface;

determining, by the electronic control unit, the location of the surface irregularity relative to the path of travel of the motor grader; and indicating, by the electronic control unit, a warning to the motor grader if the location of the surface irregularity is within the path of travel of the motor grader.

2. The method of claim 1, further comprising:

determining, by the electronic control unit, a vehicle zone of operation using the path of travel; and displaying a pair of gridlines on an operator display based on the vehicle zone of operation and the path of travel.

3. The method of claim 2, further comprising:

adjusting the pair of gridlines on the operator display as the vehicle zone of operation dynamically changes.

4. The method of claim 2, further comprising:

illuminating the surface irregularity relative to the pair of gridlines on the operator display.

5. The method of claim 1, further comprising:

suspending any warnings to the motor grader if the location of the surface irregularity is outside the path of travel.

6. The method of claim 1, further comprising:

adjusting a speed of the motor grader if the location of the surface irregularity is within the path of travel.

7. The method of claim 1, further comprising:

determining the path of travel of the motor grader along the surface based on the detected blade position, the front steering position, and the rear steering position in response to determining that the motor grader is in a rearward operating mode.

8. The method of claim 1, wherein determining, by the electronic control unit, a path of travel of the motor grader along the surface based on the front steering position, the rear steering position, and the detected blade position includes:

determining, by the electronic control unit, a path of travel of the motor grader along the surface by evaluating simultaneously the front steering position, the rear steering position, and the detected blade position.

9. A method of detecting a surface irregularity, the method comprising:

detecting an articulation angle of a rear frame of the motor grader relative to a front frame of the motor grader via at least one sensor coupled to at least one of the front frame and the rear frame, wherein the front frame is supported by a first pair of wheels including a first and a second front wheel and the rear frame is supported by a second pair of wheels including a first and a second rear wheel;

detecting a blade position that corresponds to a location of a blade relative to the front frame, wherein the blade is located between the first pair of wheels and the second pair of wheels and adjustably coupled to and positioned below the front frame;

determining a front steering position based on an angle of the first and the second front wheel relative to the front frame;

determining a rear steering position based on the detected articulation angle of the rear frame relative to the front frame;

determining, by the electronic control unit, a path of travel of the motor grader along the surface based on the front steering position, the rear steering position, and the detected blade position;

locating, by a ground image sensor operatively coupled with the electronic control unit, a surface irregularity of the surface;

determining, by an electronic control unit, the location of the surface irregularity relative to the path of travel of the motor grader;

indicating, by the electronic control unit, a warning to the motor grader if the location of the surface irregularity is within the path of travel of the motor grader; and adjusting a speed of the motor grader if the location of the surface irregularity is within the path of travel.

10. The method of claim 9, further comprising:

determining, by the electronic control unit, a vehicle zone of operation using the path of travel;

displaying, by the electronic control unit, a pair of non-concentric curved gridlines on an operator display based on the vehicle zone of operation and the path of travel of the motor grader; and adjusting the pair of gridlines on the operator display as the vehicle zone of operation dynamically changes with rearward movement of the motor grader.

11. The method of claim 9, further comprising:

suspending, by the electronic control unit, any warnings to the motor grader if the location of the surface irregularity is outside the path of travel.

12. The method of claim 9, further comprising:

determining the path of travel of the motor grader along the surface based on the detected blade position, the front steering position, and the rear steering position in response to determining that the motor grader is in a rearward operating mode.

13. The method of claim 9, wherein determining, by the electronic control unit, a path of travel of the motor grader along the surface based on the front steering position, and the rear steering position, and the detected blade position includes:

determining, by the electronic control unit, a path of travel of the motor grader along the surface by evaluating simultaneously the detected blade position, the front steering position, and the rear steering position.

14. A motor grader configured to detect a surface irregularity on a surface while moving rearwardly comprising:

a front frame supported by a first pair of wheels including a first and a second front wheel;

a rear frame supported by a second pair of wheels including a first and a second rear wheel, wherein the rear frame is configured to rotate relative to the front frame to change an articulation angle of the rear frame relative to the front frame;

a blade located between the first pair of wheels and the second pair of wheels and adjustably coupled to and positioned below the front frame;

a first sensor configured to detect a blade position that corresponds to a location of a blade relative to the front frame;

a second sensor configured to detect the articulation angle of the rear frame relative to the front frame;

a third sensor configured to detect a location of a surface irregularity on the surface;

an electronic control unit operatively coupled to the first sensor, the second sensor, and the third sensor and configured to:

determine a front steering position based on a first and second front wheel location input corresponding to an angle of the first and the second front wheel relative to the front frame;

determine a rear steering position corresponding to the detected articulation angle of the rear frame relative to the front frame;

determine a path of travel of the motor grader along the surface based on the front steering position, the rear steering position, and the detected blade position;

determine the location of the surface irregularity relative to the path of travel of the motor grader; and provide an indication of whether the location of the surface irregularity is within the path of travel of the motor grader.

15. The motor grader of claim 14, wherein the electronic control unit is configured to determine a path of travel of the motor grader along the surface by evaluating simultaneously the detected blade position, the front steering position, and the rear steering position.

16. The motor grader of claim 14, wherein the electronic control unit is configured to adjust a speed of the motor grader if the location of the surface irregularity is within the path of travel.

17. The motor grader of claim 14, wherein the electronic control unit is configured to:

determining a vehicle zone of operation using the path of travel; and cause an operator display to display a pair of non-concentric curved gridlines based on the vehicle zone of operation and the path of travel.

18. The motor grader of claim 14, wherein the electronic control unit is configured to:

indicate a warning if the surface irregularity is within the path of travel.

* * * * *